United States Patent
Nordlof et al.

(10) Patent No.: US 11,625,693 B2
(45) Date of Patent: *Apr. 11, 2023

(54) SYSTEM AND METHOD FOR PAYMENT PLATFORM SELF-CERTIFICATION FOR PROCESSING FINANCIAL TRANSACTIONS WITH PAYMENT NETWORKS

(71) Applicant: Worldpay, LLC, Symmes Township, OH (US)

(72) Inventors: Johan Mattias Nordlof, Denver, CO (US); Douglas Michael Bay, Castle Rock, CO (US)

(73) Assignee: Worldpay, LLC, Symmes Township, OH (US)

( * ) Notice: Subject to any disclaimer, the term of this patent is extended or adjusted under 35 U.S.C. 154(b) by 247 days.

This patent is subject to a terminal disclaimer.

(21) Appl. No.: 17/037,863

(22) Filed: Sep. 30, 2020

(65) Prior Publication Data

US 2021/0012298 A1    Jan. 14, 2021

Related U.S. Application Data

(63) Continuation of application No. 16/123,392, filed on Sep. 6, 2018, now Pat. No. 10,824,998, which is a
(Continued)

(51) Int. Cl.
*G06Q 20/02* (2012.01)
*G06Q 20/38* (2012.01)
*G06Q 20/40* (2012.01)

(52) U.S. Cl.
CPC ..... *G06Q 20/027* (2013.01); *G06Q 20/38215* (2013.01); *G06Q 20/4016* (2013.01)

(58) Field of Classification Search
CPC ............ G06Q 20/027; G06Q 20/3825; G06Q 20/4016
(Continued)

(56) References Cited

U.S. PATENT DOCUMENTS 6,658,568 B1    12/2003  Ginter et al.
7,069,234 B1 *   6/2006  Cornelius .............. G06Q 40/00
                                                            705/26.8
(Continued)

OTHER PUBLICATIONS

Crawford, "New Methods of Payment and New Forms of Money", Banking & Finance Law Review 20/3: 393-409, HAB Press Limited (Year: 2004).*
(Continued)

*Primary Examiner* — Frantzy Poinvil
(74) *Attorney, Agent, or Firm* — Bookoff McAndrews, PLLC

(57) ABSTRACT

Payment platforms such as point of sale terminals can send test transactions to an acquirer processor certification and analytics system for certification of the payment platform's readiness to perform financial transaction processing with payment networks. A payment platform sends a test transaction to an acquirer processor and receives a unique request identifier. The request identifier and a test identifier associated with the test transaction are sent to an analytics engine that retrieves data associated with the test transaction from the acquirer processor, and expected values based on the test identifier. The analytics engine performs a comparison and determines a certification result for the payment platform based on the comparison. Based on certification results, authorization or licenses can be granted to payment platforms to use payment networks of the acquirer processor.

20 Claims, 5 Drawing Sheets

Related U.S. Application Data continuation of application No. 14/752,063, filed on Jun. 26, 2015, now Pat. No. 10,096,007.

(58) Field of Classification Search
USPC .................................................. 705/3–44, 79
See application file for complete search history.

(56) References Cited

U.S. PATENT DOCUMENTS

| | | | |
|---|---|---|---|
| 7,315,826 B1 | 1/2008 | Guheen et al. | |
| 7,827,108 B2 | 11/2010 | Perlman et al. | |
| 7,926,712 B2 | 4/2011 | Schlabach et al. | |
| 8,123,122 B2 | 2/2012 | Shepley et al. | |
| 8,165,965 B2 | 4/2012 | Ritter | |
| 8,190,528 B2 | 5/2012 | Ginter et al. | |
| 8,688,461 B1 | 4/2014 | Richards et al. | |
| 8,751,793 B2 | 6/2014 | Ginter et al. | |
| 8,793,777 B2 | 7/2014 | Colson | |
| 8,868,456 B1 | 10/2014 | Haldeman et al. | |
| 9,449,320 B1* | 9/2016 | Walters | G06Q 20/40 |
| 10,102,526 B1* | 10/2018 | Madisetti | G06Q 20/389 |
| 11,099,835 B1* | 8/2021 | Wall | G06F 11/3664 |
| 11,405,189 B1* | 8/2022 | Bennison | H04L 9/0656 |
| 2003/0217011 A1 | 11/2003 | Peinado et al. | |
| 2004/0064351 A1* | 4/2004 | Mikurak | G06Q 30/0269 |
| | | | 705/22 |
| 2004/0107125 A1 | 6/2004 | Guheen et al. | |
| 2005/0182774 A1* | 8/2005 | Weir | G06Q 20/10 |
| 2006/0059063 A1 | 3/2006 | LaComb et al. | |
| 2006/0178918 A1 | 8/2006 | Mikurak | |
| 2008/0147455 A1* | 6/2008 | Brunswig | G06Q 10/02 |
| | | | 705/7.38 |
| 2008/0201264 A1 | 8/2008 | Brown et al. | |
| 2009/0124375 A1* | 5/2009 | Patel | G07F 17/32 |
| | | | 463/29 |
| 2009/0172402 A1 | 7/2009 | Tran | |
| 2011/0251868 A1 | 10/2011 | Mikurak | |
| 2012/0022971 A1* | 1/2012 | Morris | G06Q 20/382 |
| | | | 705/26.42 |
| 2013/0173436 A1 | 7/2013 | Woods et al. | |
| 2013/0268340 A1 | 10/2013 | Colon et al. | |
| 2014/0081861 A1 | 3/2014 | Berland et al. | |
| 2014/0122325 A1 | 5/2014 | Zoldi et al. | |
| 2014/0222610 A1 | 8/2014 | Mikurak | |
| 2014/0372320 A1 | 12/2014 | Goldfarb et al. | |
| 2015/0242823 A1 | 8/2015 | Dheer et al. | |
| 2016/0132861 A1 | 5/2016 | Fontaine et al. | |
| 2018/0288022 A1* | 10/2018 | Madisetti | H04L 63/061 |
| 2020/0380490 A1* | 12/2020 | Jayachandran | G07G 1/0009 |

OTHER PUBLICATIONS

Hong Wang, "Secure Wireless Payment Protocol", Ottawa-Carleton Institute for Computer Science, Carleton University, Ottawa, Canada, May 15, 2002.

* cited by examiner

SYSTEM AND METHOD FOR PAYMENT PLATFORM SELF-CERTIFICATION FOR PROCESSING FINANCIAL TRANSACTIONS WITH PAYMENT NETWORKS

CROSS-REFERENCE TO RELATED APPLICATION(S)

This patent application is a continuation of and claims the benefit of priority to U.S. application Ser. No. 16/123,392, filed on Sep. 6, 2018, now U.S. Pat. No. 10,824,998 issued on Nov. 03, 2020 which is a continuation of and claims the benefit of priority to U.S. application Ser. No. 14/752,063, filed on Jun. 26, 2015, now U.S. Pat. No. 10,096,007, issued on Oct. 9, 2018, the entireties of which are incorporated herein by reference.

TECHNICAL FIELD

The subject application teaches example embodiments that relate generally to self-certification for payment platforms that process financial transactions with acquirer processors.

BACKGROUND

Merchants and other store owners have point of sale ("POS") terminals and POS systems that can accept check or payment card payments from consumers for goods and services. Merchants typically contract with an acquirer processor to process payment transactions originating from the merchant's POS terminals and POS systems. Acquirer processors process the payment transactions and settle funds between consumer's and merchant's accounts. Online vendors accept bank and payment card payments from Internet customers and can process those payments using services provided by payment network providers such as acquirer processors. Utilities, service providers, and other online parties similarly accept bank transfers and accept payments from payment card using similar services provided by payment network providers.

Each merchant, online vendor, utility, or service provider can be required to certify their respective payment platforms with the payment network provider. For example, a merchant can be required to use only certified POS terminals or POS systems on the acquirer processor's payment processing network. The acquirer processor generally requires the developer of the POS terminal or POS system to perform a set of certification tests with a certification system. The certification tests verify that the merchant's payment platforms will be properly configured to send the required transaction data in the correct format to the acquirer processor. Once certified, the acquirer processor grants access to the acquirer processor's payment processing network to the certified payment platforms.

Certification testing can involve significant time and expense for all parties involved, even when a payment platform passes a certification test on the first attempt. When errors are discovered during certification, a payment platform may need to be fixed and then go through the entire certification process again. When payment platforms are updated via software or firmware, for example in order to accept a new form of payment or add new features, those payment platforms again may need to be recertified. Certification therefore can be an iterative, time-consuming and expensive process. However, certification is an important step to ensure stability of production systems. If certification costs are high, parties may be hesitant to deploy new services on their payment platforms, thereby slowing the availability of novel features and programs to consumers. If parties roll out updates without first certifying their payment platforms, errors that would otherwise occur with a certification system during testing instead occur on an acquirer processor's production system.

It is undesirable to have errors occur on a production system for a number of reasons. Errors can result in purchase transactions being unexpectedly declined, transactions being allowed that should have been declined, accounts being undercharged which can require subsequent corrective actions, accounts being overcharged which can result in overdraft fees, and wrong accounts being charged or credited, among other possible negative outcomes. Negative experiences can not only alienate customers of the merchant, but can adversely impact the image of the payment platform provider or acquirer processor with the merchant and require costly multi-party support actions to correct. Additionally, errors can burden production systems that may be fully loaded or otherwise ill-equipped for handling and debugging errors.

SUMMARY

In an example embodiment, a financial transaction certification system includes an acquirer processor and an analytics system associated with the acquirer processor. The acquirer processor is configured to receive a financial transaction record from a payment platform, generate a unique request identifier that is associated with the financial transaction record, and send the request identifier back to the payment platform. The analytics system is configured to receive the request identifier and a test identifier from the payment platform. The analytics system uses the request identifier to retrieve data associated with the financial transaction record from the acquirer processor, and uses the test identifier to determine one or more expected values for the data associated with the financial transaction record. The analytics system compares the retrieved data and the expected values to determine a certification result that is sent to the payment platform. In embodiments, the acquirer processor can be a certification test system or a production system. In embodiments, the financial transaction record can be a test transaction that is associated with a test identifier and can include one or more data fields that are to be compared with expected values by the analytics system. In an embodiment, the analytics system can send a license which allows use of an acquirer processor's production system. The sending of the license can be based at least in part on one or more certification results. In embodiments, the license can be sent to one or more payment platforms or to a developer for use on one or more payment platforms. In an embodiment, the financial transaction certification system can include one or more payment platforms. In various embodiments, a payment platform can be a point of sale terminal, a point of sale system, a payment platform with new software or firmware, or a payment platform with a feature to be certified by the financial transaction certification system.

In an example embodiment, a method includes sending a transaction to an acquirer processor system, receiving a request identifier in response, sending the request identifier and a test identifier to an analytics system that is in communication with the acquirer processor system, and receiving a certification test result from the analytics system. The analytics system is configured to receive the request identifier and the test identifier from the payment platform. The analytics system uses the request identifier to retrieve data associated with the financial transaction record from the acquirer processor. The analytics system uses the test identifier, which is associated with the transaction, to determine one or more expected values for the data associated with the transaction. The analytics system compares at least a portion of the retrieved data with one or more expected values to determine the certification test result. In embodiments, the acquirer processor system can be a certification test system or a production acquirer process system. In an embodiment, the transaction is a test transaction that includes one or more data fields that are compared with expected values by the analytics system. In an embodiment, the method further includes receiving a license to use of an acquirer processor's production system. The receiving of the license can be based at least in part on one or more certification results. In an embodiment, the method further includes receiving data associated with a set of certification test results from the analytics system. In an embodiment, the method further includes receiving a test identifier of the next test transaction to be performed with the acquirer processor system. In an embodiment, the method further includes sending the next test transaction based at least in part on the certification test result.

In an example embodiment, a computer-implemented financial transaction certification method includes selecting a test identifier that is associated with a particular certification test, generating a test transaction in accordance with the particular certification test requirements, and sending the test transaction from a payment platform that is under test to an acquirer processor certification and analytics system. The method further includes receiving a request identifier from the acquirer processor certification and analytics system in response to the sending of the test transaction, sending the request identifier and the test identifier to the acquirer processor certification and analytics system for certification, and receiving a certification test result for the test transaction from the acquirer processor certification and analytics system. In an embodiment, the acquirer processor certification and analytics system determines the certification test result by retrieving data associated with the test transaction using the request identifier, determining one or more expect values of the test transaction using the test identifier, and comparing at least a portion of the retrieved data associated with the test transaction with one or more of the expected values. In embodiments, the method further includes receiving one or more of a test identifier of the next test transaction to be sent to the acquirer processor certification and analytics system from the payment platform, or an authorization to use a production acquirer processor system by the payment platform, or a license that is required to use the production acquirer processor system by the payment platform. In an embodiment, the method further includes receiving certification test results from the acquirer processor certification and analytics system. In embodiments, the payment platforms under test can be a point a point of sale terminal, a point of sale system, a payment platform with new software or firmware, and a payment platform with a feature to be certified. In embodiments, the test transaction can include one or more data fields to be compared to expected values, ranges of expected values, threshold values, subsets of alphanumeric values, pluralities of alphanumeric values, valid tokens, payment card numbers, merchant identification numbers, or payment amounts.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
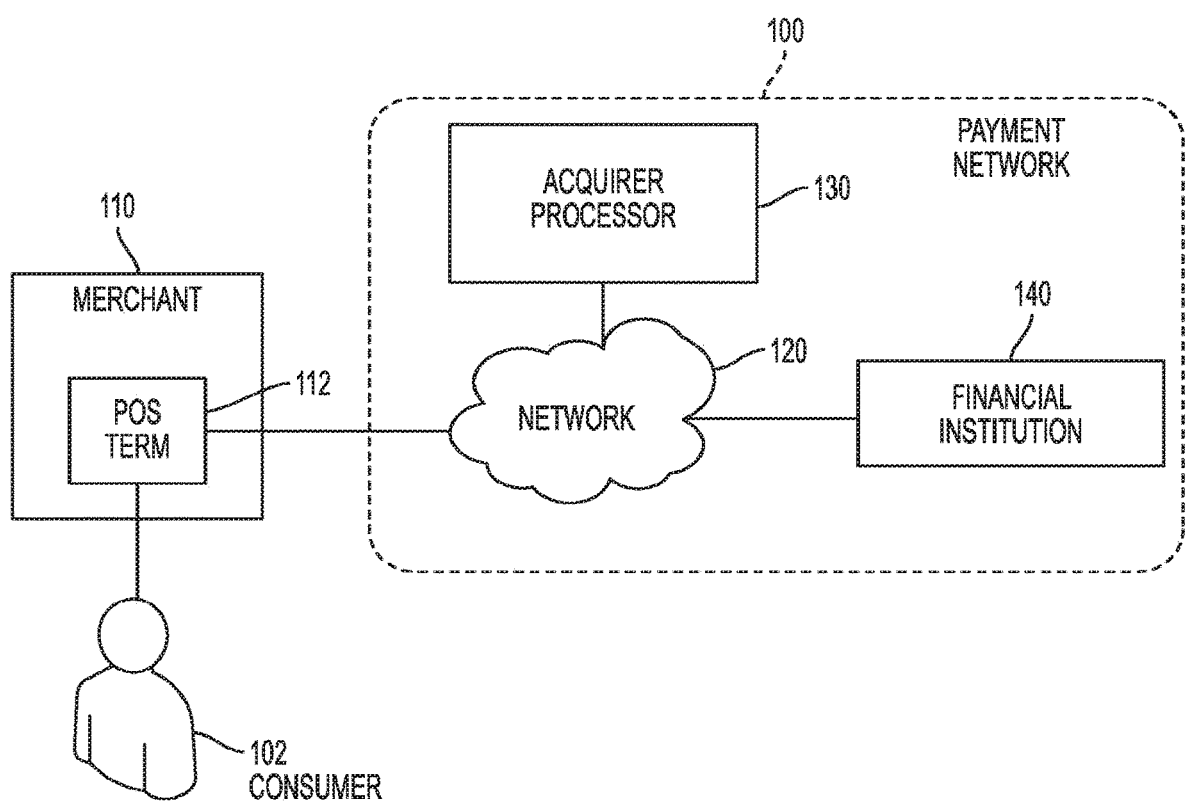
FIG. 1 is a diagram of an example payment processing network.

Various non-limiting embodiments of the present disclosure will now be described to provide an overall understanding of the principles of the structure, function, and use of systems, apparatuses, devices, and methods disclosed herein related to certification and analytics systems for self-certification of payment platforms. One or more examples of these non-limiting embodiments are illustrated in the selected examples disclosed and described in detail with reference made to FIGS. 1-5 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated by those of ordinary skill in the art that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment,"

"some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack.

Merchants use payment platforms such as Point Of Sale ("POS") terminals and POS systems to accept payments from consumers in the form of cash, check, credit cards and so forth. Although POS terminals and POS systems are the most common type of payment platforms, the term "payment platform" used herein is intended to be construed broadly and would include systems for coupon redemption, and systems for implementing frequent use programs or customer loyalty programs, among other suitable transaction-based systems that require certification of their ability to correctly processes transactions with other systems. Non-limiting examples of transaction-based systems could also include payment facilitators, ecommerce systems, mobile platforms, non-terminal POS solutions, and software solutions such as those developed by independent software vendors, among other suitable transaction-based systems. Further, although this disclosure describes transaction handling certification for payment platforms, this is done for clarity of exposition only. The inventive principles disclosed herein can be applicable to other suitable transaction-based platforms requiring certification as well as non-payment related transactions including, without limitation, underwriting transactions.

Turning to FIG. 1, a consumer 102, during the checkout process with a merchant, pays for goods or services from a merchant 110 at a POS terminal 112. The consumer 102 can use a payment card as payment and the transaction is processed through a payment network 100. Because a merchant 110 generally uses a different bank or financial institution 140 than the consumer 102, an acquirer processor 130 handles the financial transactions that transfer payment between the financial institutions 140 of the consumer 102 and that of the merchant 110. The consumer 102 swipes his or her payment card at the merchant's 110 POS terminal 112.

For simplicity, a "payment card" or "payment vehicle" generally refers to any type of financial alternative to currency, such as credit cards, debit cards, smart cards, single-use cards, pre-paid cards, and the like. The POS terminal 112 sends a payment request across a network 120 to the acquirer processor 130. The acquirer processor 130 requests an electronic transfer of funds from the financial institution 140 associated with the payment vehicle of the consumer 102, and settles the received funds to the financial institution 140 associated with the merchant 110.

Similarly, a consumer 102 can purchase goods and services from online vendors, utilities, and service providers among other parties. Those parties' payment platforms can accept bank and payment card payments, as well as payments using third party payment providers, as would be understood by one of ordinary skill in the art. Example third party payment providers include, but are not limited to Apple Pay™, Android Pay™, and PayPal™ among other suitable third party payment providers. Consumers 102 also can pay for goods and services using a mobile app executing on a mobile computing device, such as an iPhone™ from Apple™, or an Android™ based smartphone.

Before an acquirer processor 130 grants access to the acquirer processor's productions system for processing payments, a payment platform can be required to go through a certification process. The certification process can include sending one or more test transactions from a payment platform to a certification system and analyzing the transaction using an analytics system.

Figure 2:
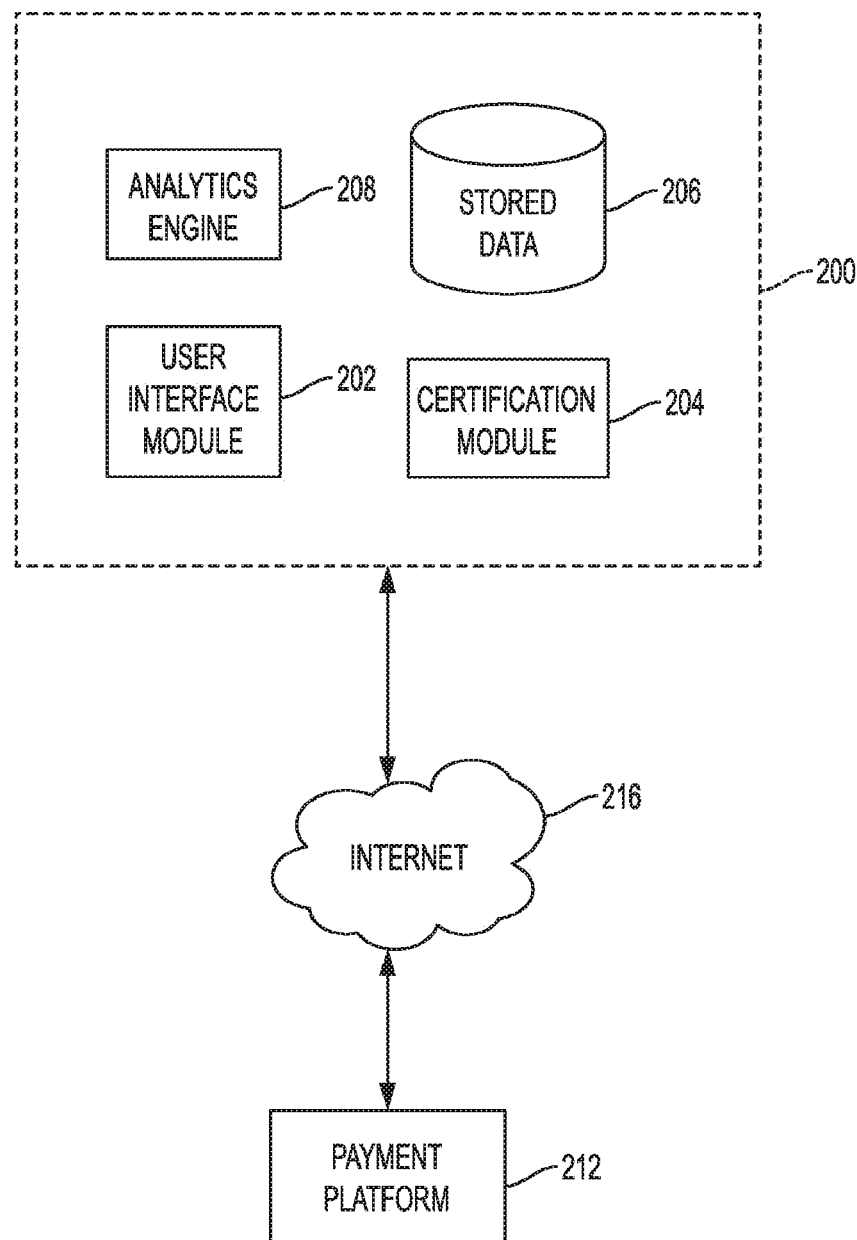
FIG. 2 is a block diagram of an example of components of a certification and analytics system.

Referring to FIG. 2, an embodiment of a certification and analytics system 200 is presented. The certification and analytics system 200 can include a user interface module 202, a certification module 204, a data store such as a database 206, and an analytics engine 208, among other possible suitable components. A developer can access the certification and analytics system 200 over the Internet 216 or any other suitable network or network connection. For example, a developer can send a test transaction from the payment platform 212 over the Internet 216 to the certification module 204, receive a response, and then forward the response and information about the test transaction to the analytics engine 208 for analysis.

The user interface module 202 can be configured to serve web pages or support other application programming interfaces (APIs) for developers to test payment platforms 212 with the certification and analytics system 200. In an embodiment, the user interface module 202 can provide an interface for a developer to send the response and information about the test transaction to the certification and analytics system 200 for analysis by the analytics engine 208.

The certification module 204 can be configured to accept test transactions from the payment platform 212 that is under test. In an embodiment, the certification module 204 can be substantially identical to an acquirer processor's production system. In this embodiment, test transactions sent to the certification module 204 from the payment platform 212 are processed similarly to how an actual financial transaction would be processed in an acquirer processor's production system. The certification module 204 can receive a test transaction from the payment platform 212 and return a suitable response, such as a Request ID. as would be understood by one of ordinary skill in the art. A Request ID. also can be referred to as a request identification number, request identifier, or reference identifier (e.g., Ref. ID.)

The certification and analytics system 200 can include a database 206 or data store. The database 206 can store web pages, instructions, test information, test result information, certification results, license keys, rules for evaluating test results and providing certification results, developer information, and payment platform information, among other suitable information.

The certification and analytics system 200 can include an analytics engine 208. The analytics engine 208 can be configured to compare a test transaction received and processed by the certification module 204 with expected values. For example, a test transaction can include one or more fields of data, such as transaction amount, tip amount, a merchant identification number, a card number, a security token such as a hash of a merchant identification number and a payment card number, and so forth as would be understood by one of ordinary skill in the art. The expected values can include a particular value, a range of values, a value not to exceed a predetermined threshold, a value greater than a predetermined threshold, an alphanumeric character, a string or subset or plurality of characters, a valid token, a particular payment card number, a particular merchant identification number, and so forth. Although the operation of the certification and analytics system 200 is described for a single test transaction, the operations and structures described herein are also applicable for certification and analysis of tests that use two or more test transactions.

In an embodiment, the analytics engine 208 receives a Request ID. associated with a particular test transaction that was received and processed by the certification module 204, and a Test ID. that identifies the particular certification test for validating the test transaction with expected values. A Test ID. can also be referred to as a test identification number or test identifier. In this embodiment, the analytics engine 208 retrieves the expected values and any rules for the certification test from the database 206 based at least in part on the Test ID. The analytics engine 208 retrieves information about the test transaction from the certification module 204 based at least in part on the Request ID. The analytics engine 208 can compare the test transaction with the expected values, for example using one or more rules, to determine a certification result. The analytics engine 208 can compare the results of the processed test transaction with expected values, for example using one or more rules, to determine a certification result. The analytics engine 208 can send one or more certification results to the developer. The certification results can be presented in any suitable form, for example an indication of a pass, fail, or waived condition, one or more indications of portions of the test transaction that passed the certification test, one or more indications of portions of the test transaction that failed the certification test, one or more indications of portions of the test transaction that are waived as requirements for passing the certification test, recommended acceptable values for passing the certification test, and so forth. In a configuration, the certification results can be presented in a man-machine language, for example using a structure that can be easily read by a person and also parsed by a computing system. In a configuration, the certification results can be presented in human readable format. In a configuration the certifications results can be presented in a computer readable format.

In an embodiment, the analytics engine 208 can determine if the payment platform 212 has completed all required certification tests necessary for the payment platform 212 to interoperate with an acquirer processor's production system. In that configuration, the analytics engine 208 can present a license key to the developer upon successful completion of the required certification tests.

In an embodiment, one or more certification tests of the certification and analytics system 200 provide guidance to developers of payment platforms of available features offered by the acquirer processor. A developer of a payment platform, through the selection of certification tests, defines the scope of the features to be supported in the payment platform. In this manner, one or more of the certification tests and the analytics engine 208 not only provide a test and certification framework, but also provide a scoping framework and scoping engine functionality.

In an embodiment, the analytics engine 208 can provide notification of success or failure of certification tests to the acquirer processor. The acquirer processor can perform follow up actions based upon receiving notification. For example, if the developer has completed all of the necessary contractual obligations with the acquirer processor, then upon receiving notification of successful certification of the payment platform 212, the acquirer processor can issue a license key to the developer, or grant the developer permission to use the payment platform 212 with the acquirer processor's production system. In another example, the acquirer processor can reach out and offer to provide assistance to the developer if the payment platform 212 appears to have trouble passing one or more certification tests, for example after the payment platform 212 fails to pass a threshold number of certification attempts.

In an embodiment, the merchant and payment platform 212 can be "onboarded" with the acquirer processor. Onboarding can include entering any suitable identifying indicia about the merchant, stores, and the payment platform 212, including but not limited to the merchant or store name, an account number with an acquirer processor such as merchant identification or Merchant ID., a store addresses, a phone number, store position or positions such as GPS or global positioning system coordinates, the type of business, store hours, type of transactions, transaction amount limits, whether payment would include tipping, and so forth.

Figure 3:
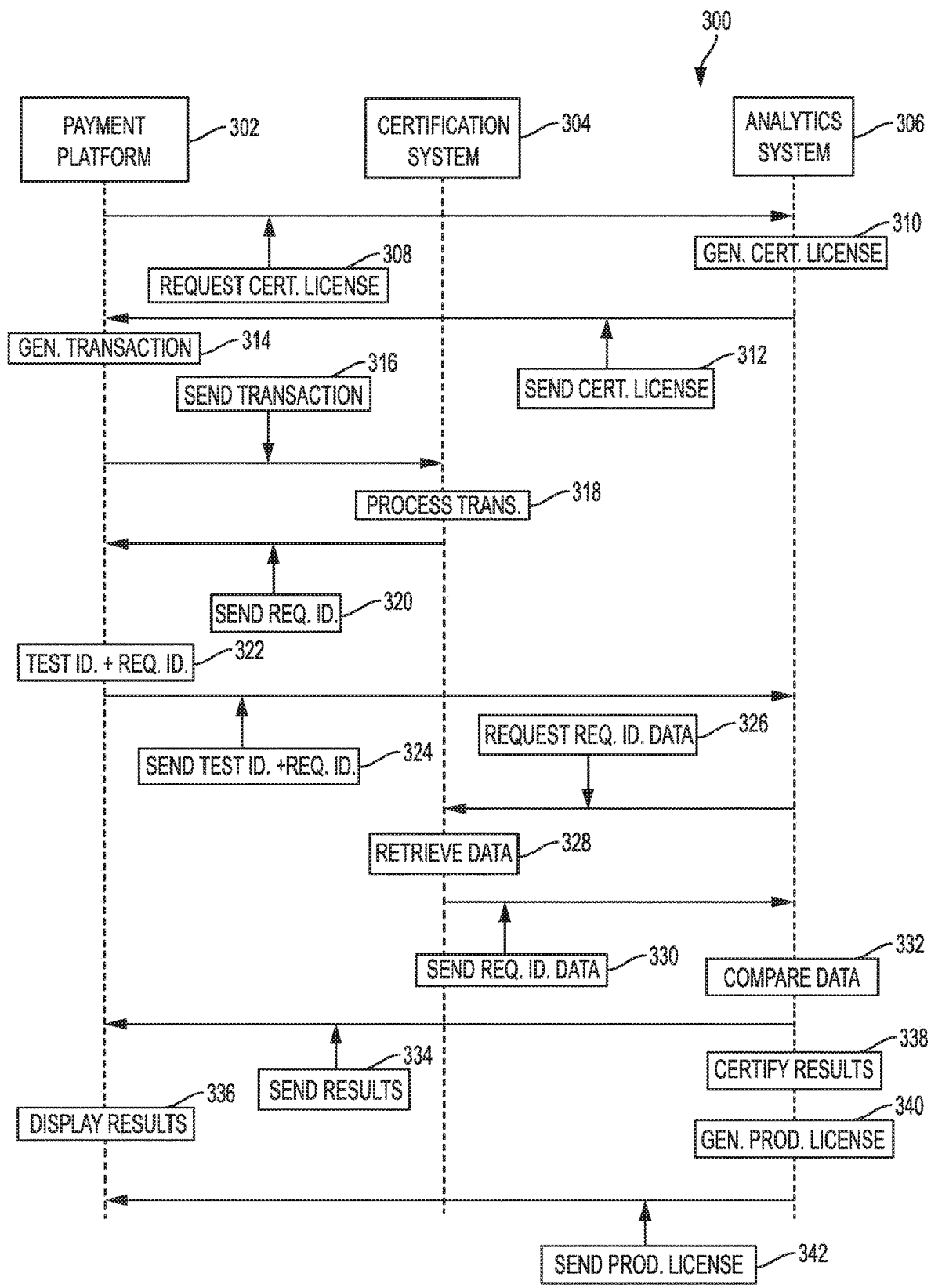
FIG. 3 is a timeline diagram of example certification and analytics systems.

Referring now also to FIG. 3, an example timeline diagram for performing certification testing is presented. In this embodiment, a payment platform 302 sends test transactions for performing certification testing with a certification system 304 and an analytics system 306. In alternative embodiments, the certification system 304 and analytics system 306 can reside on the same system, separate systems, a distributed system, and include one or more processes performed in the cloud, as would be understood by one of ordinary skill in the art.

In an optional step, the payment platform 302 can send a request 308 for a license from the analytics system 306 to use the certification system 304. The analytics system 306 can generate 310 a license to the certification system 304 and send 312 the license to the payment platform 302. In alternative embodiments, the certification license for using the certification system 304 can be provided to the developer separately, no certification license can be required by the certification system 304, or the certification system 304 can be configured to use the same license to be used by the payment platform 302 with the acquirer processor's production system.

The payment platform 302 generates 314 a test transaction for performing a certification test with the certification system 304. For example, a developer configures the payment platform 302 to send a particular test transaction identified with a test identification or Test ID. The test transaction can be used to test one or multiple parts of a transaction. For example, a test transaction can verify that the fields expected by the acquirer processor are populated with expected values, for example using the correct merchant identifier, a valid payment card number, and so forth.

In another example, the test transaction can be used to ensure that the payment amount is within predetermined limits agreed to by the acquirer processor and merchant. The payment platform 302 sends 316 the test transaction to the certification system 304. The certification system 304 processes 318 the transaction and sends 320 a Request ID. to the payment platform. The Request ID. uniquely identifies a transaction processed by a certification system 304 or a production system and can be used to track individual transactions as they are processed by a payment network.

The payment platform 302 receives the Request ID. and generates 322 a message that includes the Request ID. and the Test ID. associated with the test transaction. The payment platform 302 sends 324 the message containing the Request ID. and the Test ID. to the analytics system 306. The analytics system 306 receives the message and requests 326 data from the certification system 304 about the test transaction. The certification system 304 receives the request and retrieves 328 data about the test transaction based on the Request ID. The certification system 304 sends 330 the test transaction data to the analytics system 306. The analytics system 306 compares 322 the test transaction data with values expected for the test transaction. For example, the analytics system 306 uses rules and values store in a database that are associated with the Test ID. that was provided in the message from the payment platform 302 and generates certification results based on the comparing operations. The certification results can include an overall pass, fail, or waived indication, one or more pass, fail, or waived indications for individual fields, and suggestions or expected values as described above. The analytics system 306 sends 334 the certification results to the payment platform 302. The payment platform 302 receives the certification results and the developer can display 336 the results for the payment platform 302.

In an embodiment, the test transaction can include a field with the Test ID. In this manner, the certification system 304 and analytics system 306 would not need to receive the Test ID. in the message from the payment platform 302, but instead could determine the Test ID. from inspection of the data associated with the test transaction.

In an embodiment, the payment platform 302 can generate 314 and send 316 more than one test transaction. For example, a particular feature, function, or capability of a payment platform 302 may require multiple test transactions 1, 2, . . . , n, to certify certain functionality. The remaining operations can be performed based on the sending of test transactions 1, 2, . . . , n, as would be understood by one of ordinary skill in the art.

In an embodiment, the payment platform can generate 322 and send 324 the message that includes the Request ID. and the Test ID. upon receiving the Request ID. from the certification system 304 without requiring human interaction, for example without requiring a developer to cut and paste the Request ID. and the Test ID. into the message. In an embodiment, the developer generates 322 and sends 324 the message, for example by copying the Request ID. and Test ID. into a suitable user interface provided by the analytics system, such as a web page displayed on a computing system of the developer. In this embodiment, the developer also can receive the results sent 334 by the analytics system 306.

In an embodiment, upon completion of a certification test in the operations 314 through 334, the payment platform 302 can generate 314 and send 316 a second transaction to the certification system 304 and begin a new certification testing cycle. In a configuration, whether the second transaction is generated 314 and sent 316 can depend on the result sent 334 by the analytics system 306 for the first transaction. In another embodiment, in addition to sending 334 the result, the analytics system 306 can send 334 an indication of the next certification test to be performed, for example by sending a Test ID. of the next test transaction to the payment platform 302 or to the developer. Other suitable instructions or next operations to be performed by the payment platform 302 can be sent including, but not limited to, helpful suggestions for the developer to assist in passing the certification test, testing data such as fail/pass data or a summary of test result, data indicating the remaining tests that need to be completed successfully by the payment platform 302, example data formats of successful test transactions, and so forth.

In an embodiment, the analytics system 306 can certify 338 that a set of certifications tests have been completed successfully by the payment platform 302 with the certification system 304. Once the analytics system 306 certify 338 successful testing, the analytics system 306 can generate 340 a license to the acquirer processor's production system and send 342 the license to the developer or payment platform 302, allowing the certified payment platform 302 to immediately begin using an acquirer processor's production system. In this embodiment, developers can rapidly certify new features and updates on payment platforms and being marketing and deploying those new features and updates upon successful certification of those payment platforms 302 with the certification system 304 and analytics system 306.

Figure 4:
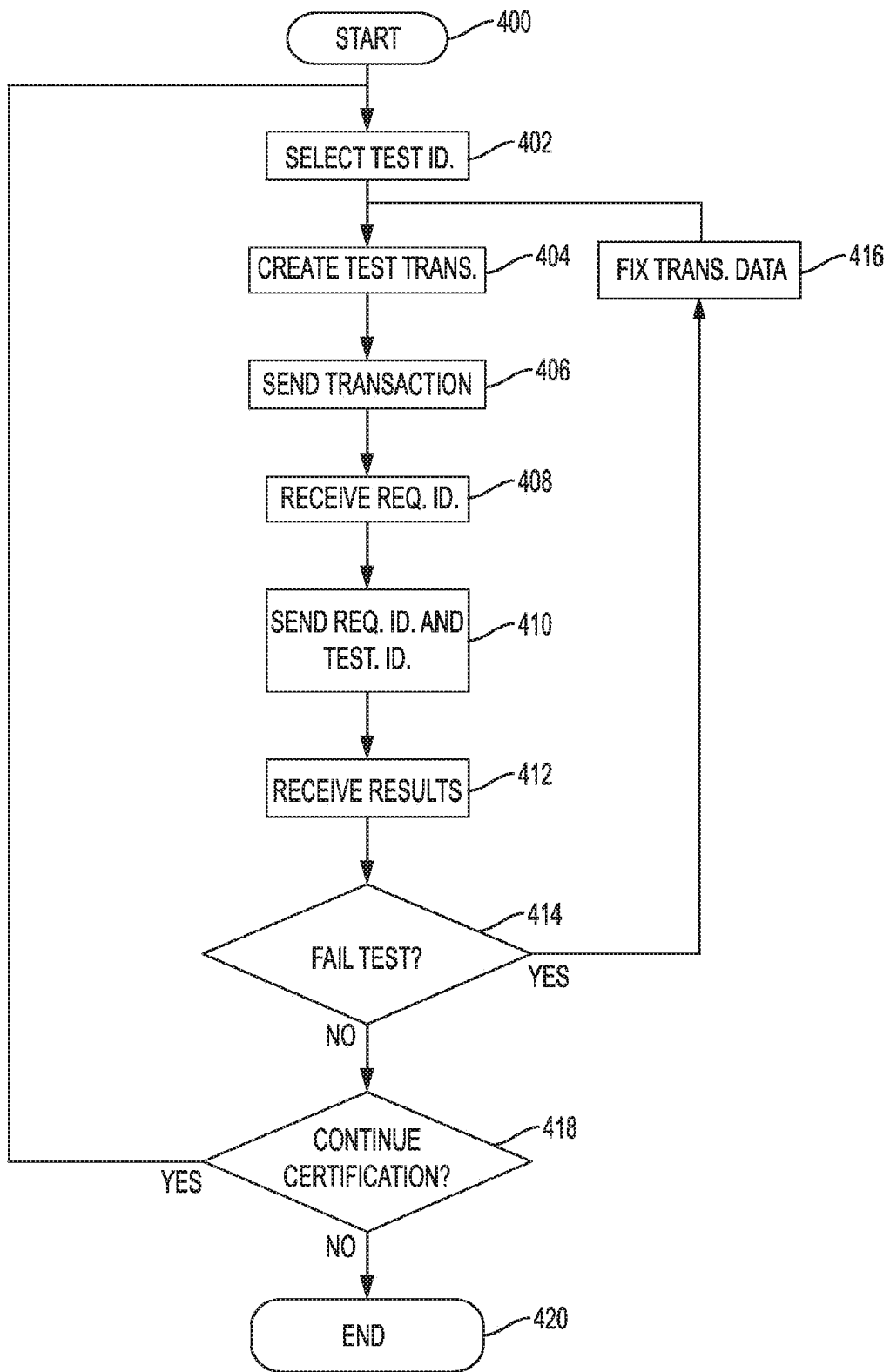
FIG. 4 is a flow diagram of example certification testing.

Referring now also to FIG. 4, an example flow diagram for certifying a development system for use with an acquirer processor's systems. Processing begins at start block 400 and continues to process block 402.

At process block 402, a developer selects a certification test for testing one or more features of the development system with an acquirer processor's systems. The development system can be a POS terminal, a POS system, a payment processing system, or any other suitable financial processing system as would be understood by one of ordinary skill in the art. The certification test can be uniquely identified by a Test ID. Processing continues to process block 404.

At process block 404, the developer creates a test transaction on the development system. The test transaction is created in accordance with the requirements of the certification test. The test transaction includes data used to determine whether the development system can interoperate with an acquirer processor's systems. Processing continues to process block 406.

At process block 406, the development system sends the test transaction to the acquirer processor system that receives and processes the test transaction as if it were an actual transaction on a production system that was received from a merchant or other party. Processing continues to process block 408.

At process block 408, the development system receives a Request ID. from the acquirer processor system. The Request ID. uniquely identifies the transaction that was received and recorded by the acquirer processor system. Processing continues to process block 410.

At process block 410, the developer sends the Request ID. and the Test ID. to an analysis system. The analysis system uses the Request ID. and the Test ID. to obtain the test transaction and expected test results. The analysis system determines whether the test transaction sent by the development system included all of the necessary data needed to pass the certification test and that the test transaction had the right format. The analysis system can be a process executing on the acquirer processor system, an independent computing system, a cloud-based computing process, or any other suitable computing system as would be understood by one of ordinary skill in the art. Processing continues to process block 412.

At process block 412, the development system receives test certification results from the analysis system. As described above, the test certification results can include an indication as to whether the test transaction passed or failed the certification test or if the result is waived as a requirement of passing the certification test, one or more indications of portions of the test transaction that passed or failed the certification test, recommended acceptable values for passing the certification test, and so forth. Processing continues to decision block 414.

At decision block 414, if the test transaction failed the certification test, then processing continues to process block 416 where the developer can correct the test transaction data, otherwise processing continues to decision block 418.

At process block 416, the developer can correct the test transaction data in the development system. For example, the developer can view the test certification results, determine where an error occurred, and make changes to either the development system or the data used by the development system to create the test transaction. Processing returns to process block 404 to create a corrected test transaction and attempt to certify the test transaction.

At process block 418, if there are additional certification tests that need to be completed by the development system, then processing returns to process block 402 where the developer can select another Test ID. and continue certifying the development system. If all certification tests completed successfully, or if the developer terminates the testing, then processing terminates at end block 420.

Figure 5:
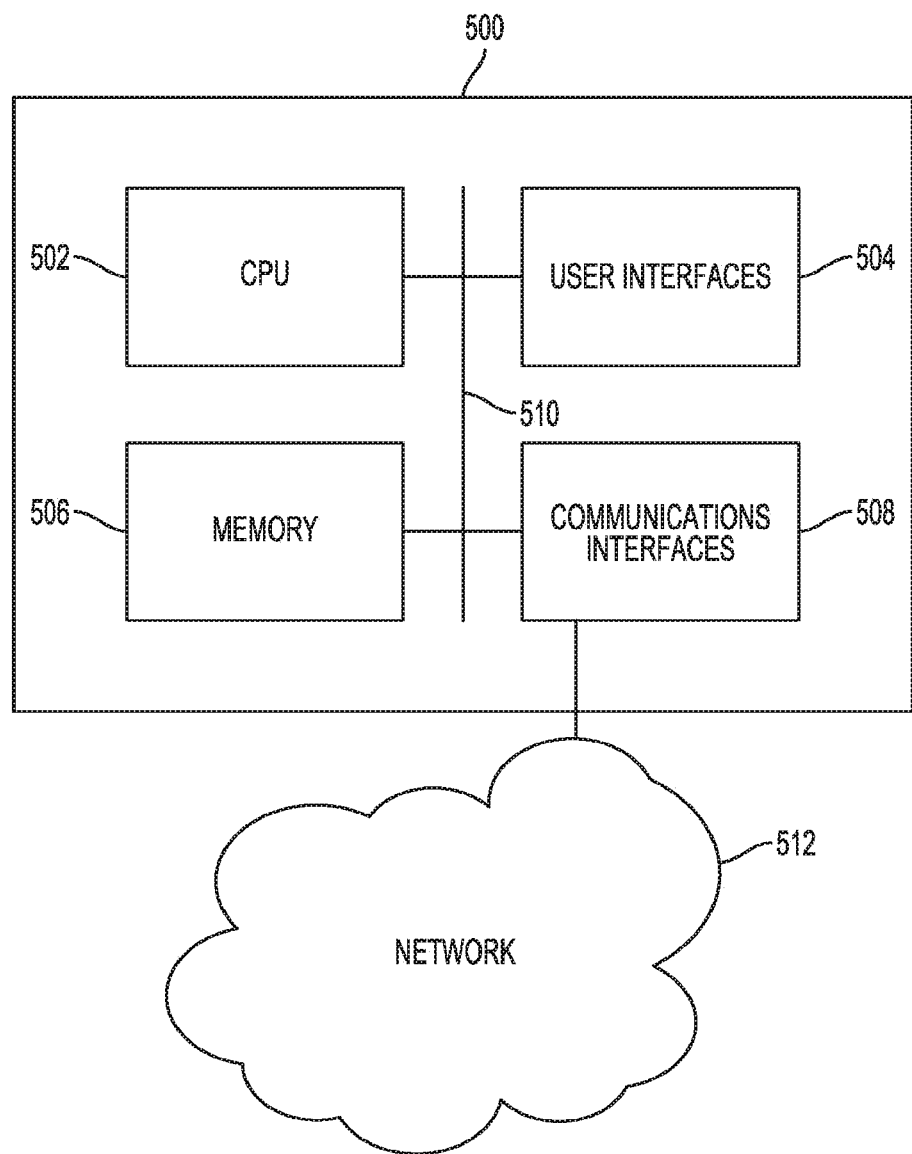
FIG. 5 is a block diagram of an example computing device.

The systems and processes described above can be performed on or between one or more computing devices 500. Referring now to FIG. 5, an example computing device 500 is presented. A computing device 500 can be a server, a computing device that is integrated with other systems or subsystems, a mobile computing device such as a smart phone, a cloud-based computing capability, and so forth. The computing device 500 can be any suitable computing device as would be understood in the art, including without limitation, a custom chip, an embedded processing device, a tablet computing device, a point of sale terminal 212 associated with a merchant 210, a back office system of a merchant 210, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 500 includes a processor 502 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 500 also includes one or more memories 506, for example read only memory (ROM), random access memory (RAM), cache memory associated with the processor 502, or other memories such as dynamic RAM (DRAM), static ram (SRAM), programmable ROM (PROM), electrically erasable PROM (EEPROM), flash memory, a removable memory card or disk, a solid state drive, and so forth. The computing device 500 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 502, or memories 506 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 508 can be configured to transmit to, or receive data from, other computing devices 500 across a network 512. The network and communication interfaces 508 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 508 can include wired data transmission links such as Ethernet and TCP/IP. The communication interfaces 508 can include wireless protocols for interfacing with private or public networks 512. For example, the network and communication interfaces 508 and protocols can include interfaces for communicating with private wireless networks such as a WiFi network, one of the IEEE 802.11x family of networks, or another suitable wireless network. The network and communication interfaces 508 can include interfaces and protocols for communicating with public wireless networks 508, using for example wireless protocols used by cellular network providers, including Code Division Multiple Access (CDMA) and Global System for Mobile Communications (GSM). A computing device 400 can use network and communication interfaces 508 to communicate with hardware modules such as a database or data store, or one or more servers or other networked computing resources. Data can be encrypted or protected from unauthorized access.

In various configurations, the computing device 500 can include a system bus 510 for interconnecting the various components of the computing device 500, or the computing device 500 can be integrated into one or more chips such as programmable logic device or application specific integrated circuit (ASIC). The system bus 510 can include a memory controller, a local bus, or a peripheral bus for supporting input and output devices 504, and communication interfaces 508. Example input and output devices 504 include keyboards, keypads, gesture or graphical input devices, motion input devices, touchscreen interfaces, one or more displays, audio units, voice recognition units, vibratory devices, computer mice, and any other suitable user interface.

The processor 502 and memory 506 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A computer-implemented method for certifying an electronic transaction terminal, comprising:
    selecting, by a development system under test, a test identifier associated with a certification test;
    sending, by the development system, a test transaction corresponding to the certification test to a certification system;
    receiving, by the development system, a request identifier from the certification system in response to the test transaction;
    sending, by the development system, the request identifier and the test identifier to an analytics system for certification; and
    receiving, by the development system, a production license from the analytics system, the production license being generated by the analytics system based on comparing transaction data associated with the request identifier with at least one expected value associated with the test identifier.

2. The computer-implemented method of claim 1, wherein the development system is configured to use the production license to access a production system of an acquirer processor.

3. The computer-implemented method of claim 2, wherein the production system is configured to process actual transactions.

4. The computer-implemented method of claim 1, wherein the test transaction comprises one or more of: transaction amount, tip amount, a merchant identification number, and a security token as a hash of a merchant identification number and a transaction vehicle number.

5. The computer-implemented method of claim 1, further comprising:
    receiving, by the development system, certification test results from the certification system; and
    presenting, by the development system, the received certification test results to a user.

6. The computer-implemented method of claim 1, wherein the development system is one of: a point of sale terminal, a point of sale system, a payment platform with new software or firmware, or a payment platform with a feature to be certified.

7. The computer-implemented method of claim 1, wherein the test transaction includes at least one data field to be compared with one or more of an expected value, an expected range of values, a threshold value, a subset of alphanumeric values, a plurality of alphanumeric values, a valid token, a transaction vehicle number, a merchant identification number, and a transaction amount.

8. The computer-implemented method of claim 1, further comprising, prior to selecting, by the development system under test, the test identifier associated with the certification test:
    sending, by the development system, a request for a certification license to the analytics system; and
    receiving, by the development system, the certification license from the analytics system,
    wherein the certification system is accessed by the development system using the certification license.

9. The computer-implemented method of claim 1, wherein the test identifier is selected from a plurality of test identifiers associated with respective certification tests.

10. The computer-implemented method of claim 1, wherein at least one of the certification system and the analytics system is implemented on an acquirer processor.

11. A system comprising:
    one or more processors; and
    one or more storage devices storing instructions which, when executed by the one or more processors, cause the one or more processors to perform operations for certifying an electronic transaction terminal, the operations comprising:
        selecting, by a development system under test, a test identifier associated with a certification test;
        sending, by the development system, a test transaction corresponding to the certification test to a certification system;
        receiving, by the development system, a request identifier from the certification system in response to the test transaction;
        sending, by the development system, the request identifier and the test identifier to an analytics system for certification; and
        receiving, by the development system, a production license from the analytics system, the production license being generated by the analytics system based on comparing transaction data associated with the request identifier with at least one expected value associated with the test identifier.

12. The system of claim 11, wherein the development system is configured to use the production license to access a production system of an acquirer processor.

13. The system of claim 12, wherein the production system is configured to process actual transactions.

14. The system of claim 11, wherein the test transaction comprises one or more of: transaction amount, tip amount, a merchant identification number, and a security token as a hash of a merchant identification number and a transaction vehicle number.

15. The system of claim 11, the operations further comprising:

receiving, by the development system, certification test results from the certification system; and presenting, by the development system, the received certification test results to a user.

16. The system of claim 11, wherein the development system is one of: a point of sale terminal, a point of sale system, a payment platform with new software or firmware, or a payment platform with a feature to be certified.

17. The system of claim 11, wherein the test transaction includes at least one data field to be compared with one or more of an expected value, an expected range of values, a threshold value, a subset of alphanumeric values, a plurality of alphanumeric values, a valid token, a transaction vehicle number, a merchant identification number, and a transaction amount.

18. The system of claim 11, the operations further comprising, prior to selecting, by the development system under test, the test identifier associated with the certification test:

sending, by the development system, a request for a certification license to the analytics system;

receiving, by the development system, the certification license from the analytics system, wherein the certification system is accessed by the development system using the certification license.

19. The system of claim 1, wherein the test identifier is selected from a plurality of test identifiers associated with respective certification tests.

20. One or more non-transitory computer readable media storing instructions which, when executed by one or more processors, cause the one or more processors to perform operations for certifying an electronic transaction terminal, the operations comprising:

selecting, by a development system under test, a test identifier associated with a certification test;

sending, by the development system, a test transaction corresponding to the certification test to a certification system;

receiving, by the development system, a request identifier from the certification system in response to the test transaction;

sending, by the development system, the request identifier and the test identifier to an analytics system for certification; and receiving, by the development system, a production license from the analytics system, the production license being generated by the analytics system based on comparing transaction data associated with the request identifier with at least one expected value associated with the test identifier.

* * * * *